(12) United States Patent
Hunzinger

(10) Patent No.: US 7,123,916 B2
(45) Date of Patent: Oct. 17, 2006

(54) HANDOFF ADAPTATION FOR CDMA SYSTEMS

(75) Inventor: Jason F. Hunzinger, Carlsbad, CA (US)

(73) Assignee: Denso Corporation, Kariya (JP)

( * ) Notice: Subject to any disclaimer, the term of this patent is extended or adjusted under 35 U.S.C. 154(b) by 815 days.

(21) Appl. No.: 09/912,795

(22) Filed: Jul. 24, 2001

(65) Prior Publication Data
US 2001/0051524 A1 Dec. 13, 2001

Related U.S. Application Data

(60) Provisional application No. 60/220,675, filed on Jul. 25, 2000.

(51) Int. Cl.
*H04Q 7/20* (2006.01)

(52) U.S. Cl. ........................ 455/437; 455/436

(58) Field of Classification Search ................ 455/436, 455/437, 439, 438, 440, 441, 226.3, 67.11, 455/226.1, 115.1, 115.3; 370/331, 332, 333, 370/334
See application file for complete search history.

(56) References Cited

U.S. PATENT DOCUMENTS

| 5,504,939 | A | | 4/1996 | Mayrand et al. ............ 455/436 |
|---|---|---|---|---|
| 5,590,177 | A | | 12/1996 | Vilmur et al. |
| 5,903,840 | A | * | 5/1999 | Bertacchi .................. 455/436 |
| 5,926,470 | A | * | 7/1999 | Tiedemann, Jr. ............ 370/334 |
| 6,233,455 | B1 | * | 5/2001 | Ramakrishna et al. ...... 455/437 |
| 6,456,847 | B1 | * | 9/2002 | Lilja et al. .................. 455/437 |
| 6,782,261 | B1 | * | 8/2004 | Ahmed et al. .............. 455/436 |
| 2002/0102977 | A1 | * | 8/2002 | Shi ........................... 455/437 |

FOREIGN PATENT DOCUMENTS

| JP | 8-126048 | 5/1996 |
|---|---|---|
| JP | 2000-83010 | 3/2000 |
| JP | 2000-125334 | 4/2000 |

OTHER PUBLICATIONS

Japanese Office Action dated Feb. 3, 2004 from similar Japanese patent.

* cited by examiner

*Primary Examiner*—Temica Beamer
*Assistant Examiner*—Joy Contee
(74) *Attorney, Agent, or Firm*—Harness, Dickey & Pierce, PLC

(57) ABSTRACT

A method of determining handoff timing for a wireless device is provided. The method includes selecting a call characteristic. The call characteristic is evaluated to determine if it is relevant to current conditions. If the call characteristic is relevant, an adapted value for handoff timeout is determined based on the call characteristic. The handoff timeout is set to the adapted value.

40 Claims, 6 Drawing Sheets

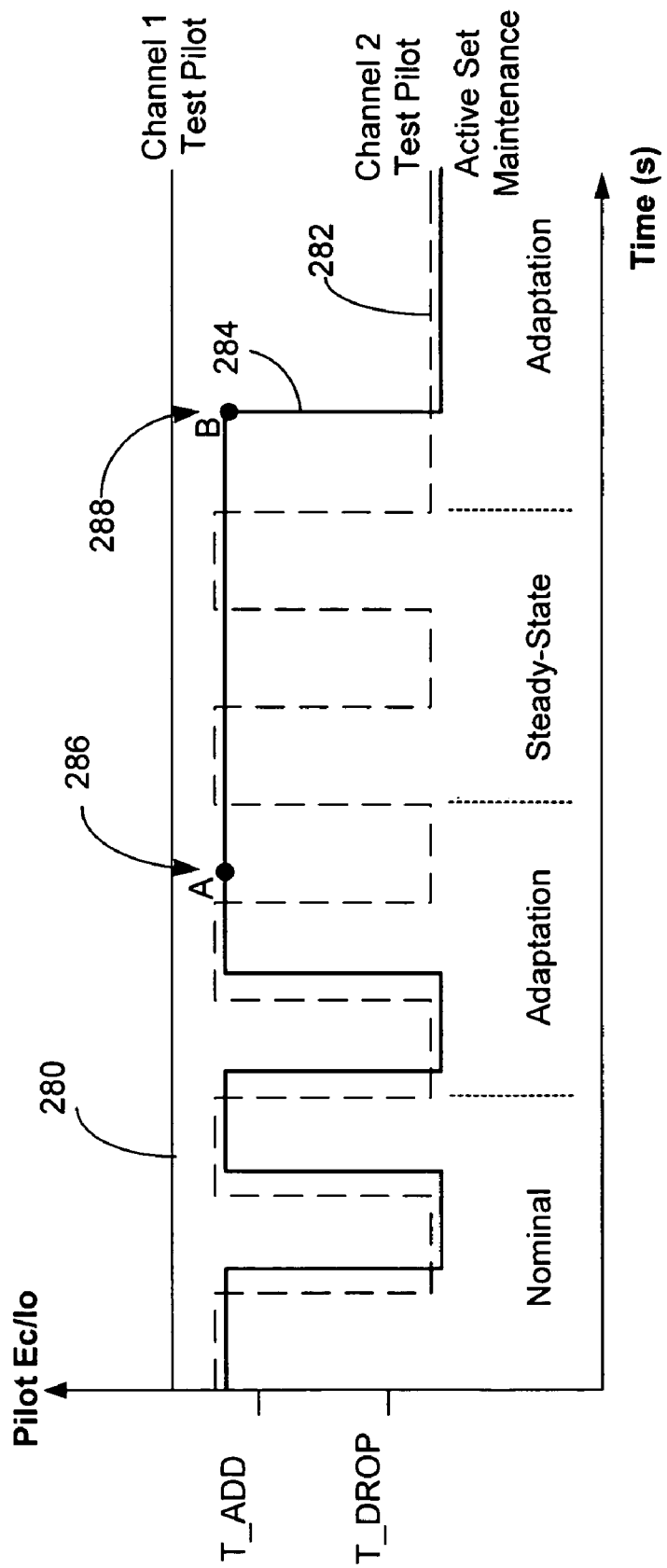

HANDOFF ADAPTATION FOR CDMA SYSTEMS

CROSS-REFERENCE TO RELATED APPLICATIONS

This application claims the benefit of U.S. Provisional Application No. 60/220,675, filed Jul. 25, 2000, the entire disclosure of which is incorporated herein by reference.

TECHNICAL FIELD

This invention relates to wireless communications devices, and more particularly to handoff methods for wireless communications based on CDMA.

BACKGROUND

Cellular telephones may operate under a variety of standards including the code division multiple access (CDMA) cellular telephone communication system as described in TIA/EIA, IS-95, Mobile station-Base Station Compatibility Standard for Dual-Mode Wideband Spread Spectrum Cellular System, published July 1993. CDMA is a technique for spread-spectrum multiple-access digital communications that creates channels through the use of unique code sequences. In CDMA systems, signals can be and are received in the presence of high levels of interference. The practical limit of signal reception depends on the channel conditions, but CDMA reception in the system described in the aforementioned IS-95 Standard can take place in the presence of interference that is 18 dB larger than the signal for a static channel. Typically, the system operates with a lower level of interference and dynamic channel conditions.

A mobile station using the CDMA standard constantly searches a Pilot Channel of neighboring base stations for a pilot that is sufficiently stronger than a pilot add threshold value T_ADD. As the mobile station moves from the region covered by one base station to another, the mobile station promotes certain pilots from the Neighbor Set to the Candidate Set, and notifies the base station or base stations of the promotion from the Neighbor Set to the Candidate Set via a Pilot Strength Measurement Message. The base station determines an Active Set according to the Pilot Strength Measurement Message, and notifies the mobile station of the new Active Set via a Handoff Direction Message. The mobile station will maintain communication with both the old base station and the new base station so long as the pilots for each base station are stronger than a pilot drop threshold value T_DROP. When one of the pilots weakens to less than a pilot drop threshold value, the mobile station notifies the base station of the change. The base station may then determine a new Active Set, and notifies the mobile station of that new Active Set. Upon notification by the base station, the mobile station then demotes the weakened pilot to the Neighbor Set.

Switching pilots into and out of the Active Set of a mobile station causes several problems with the handoff. First, the mobile station may have several pilots active at the same time. Second, the system capacity is decreased. Third, excessive signaling between the mobile station and base stations results from the increased number of handoff messages. It is desired to provide a method and system that reduces the switching of pilots into and out of the Active Set of a mobile station.

SUMMARY

A method of determining handoff timing for a wireless device is provided. The method includes selecting a call characteristic. The call characteristic is evaluated to determine if it is relevant to current conditions. If the call characteristic is relevant, an adapted value for handoff timeout is determined based on the call characteristic. The handoff timeout is set to the adapted value.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6 is an illustration of waveforms depicting the operation of an embodiment of the invention.

Like reference symbols in the various drawings indicate like elements.

DETAILED DESCRIPTION

Figure 1:
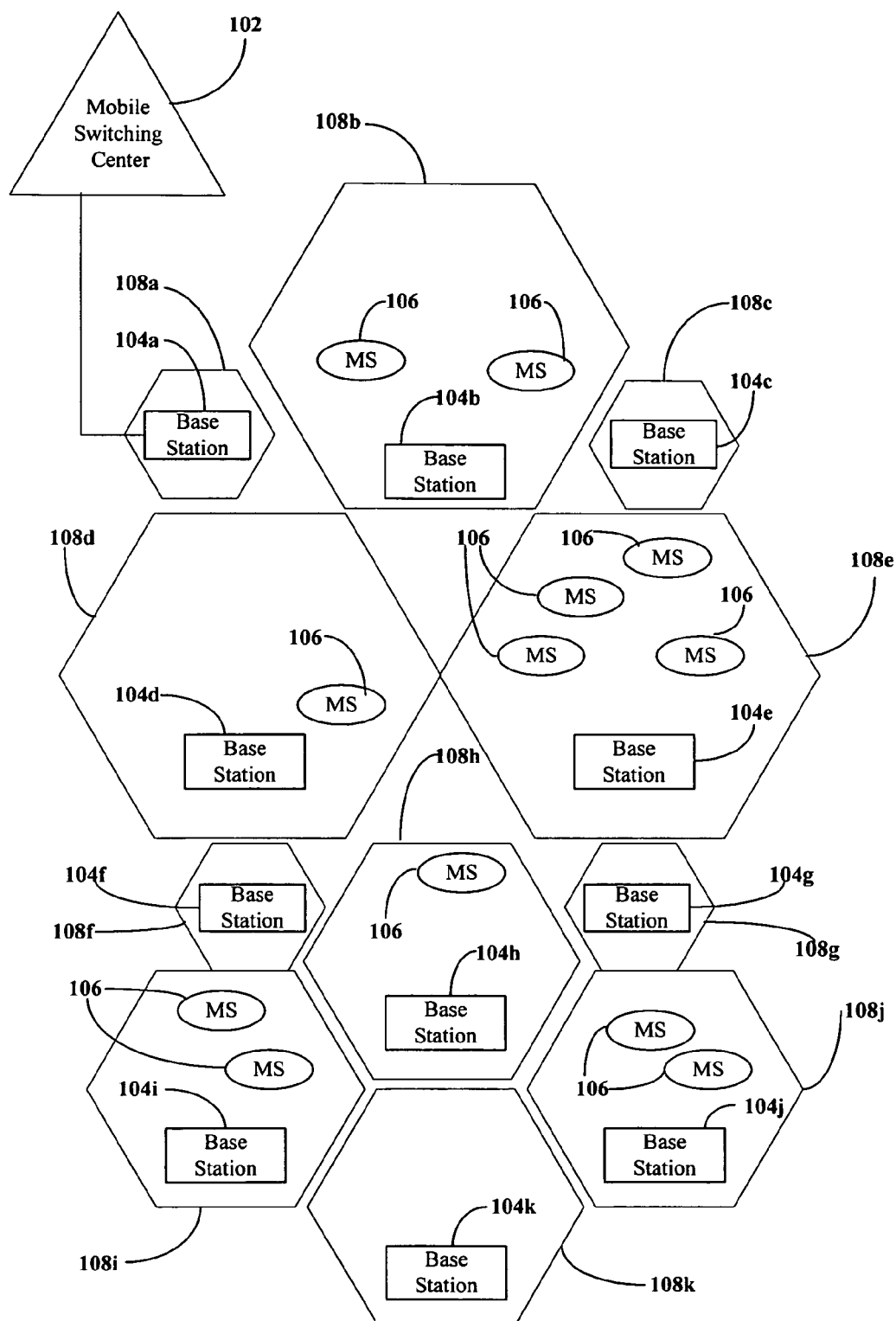
FIG. 1 is an illustration of a wireless communication system.

FIG. 1 illustrates components of an exemplary wireless communication system. A mobile switching center 102 communicates with base stations 104a–104k (only one connection shown). The base stations 104a–104k (generally 104) transmits data to and receives data from mobile stations 106 within cells 108a–108k (generally 108). A cell 108, corresponding to a geographic region, is served by abased station. Practically, said geographic regions often overlap to a limited extent.

A mobile station 106 is capable of receiving data from and transmitting data to a base station 104. In one embodiment, the mobile station 106 receives and transmits data according to a Code Division Multiple Access (CDMA) technique. CDMA is a communication technique that permits mobile users of wireless communication devices to exchange data over a telephone system, wherein radio signals carry data to and from the wireless devices. A set of standards that define a version of CDMA that is particularly suitable for use with the invention include IS-95, IS-95A, and IS-95B, Mobile Station-Base Station Compatibility Standard for Dual-Mode Spread Spectrum Systems; TIA/EIA/IS-2000-2, Physical Layer Standard for cdma2000 Spread Spectrum Systems; and TIA/EIA/IS-2000-5 Upper Layer (Layer 3) Signaling Standard for cdma2000 Spread Spectrum Systems, all of which are herein incorporated by reference in their entirety.

Under the CDMA standard, additional cells 108a, 108c, 108d, and 108e adjacent to the cell 108b permit mobile stations 106 to cross cell boundaries without interrupting communications. This is so because base stations 104a, 104c, 104d, and 104e in adjacent cells assume the task of transmitting and receiving data for the mobile stations 106. The mobile switching center 102 coordinates all communication to and from mobile stations 106 in a multi-cell region. Thus, the mobile switching center 102 may communicate with many base stations 104.

Mobile stations 106 may move about freely within the cell 108 while communicating either voice or data. Mobile stations 106 not in active communication with other telephone system users may, nevertheless, continue to scan for transmissions from the base stations 104 in the cells 108 to detect pilots that are sufficiently strong with which to establish a communications link. In addition, mobile stations 106 may drop base stations 104 in which the energy level of the pilot is not sufficiently strong.

Figure 2:
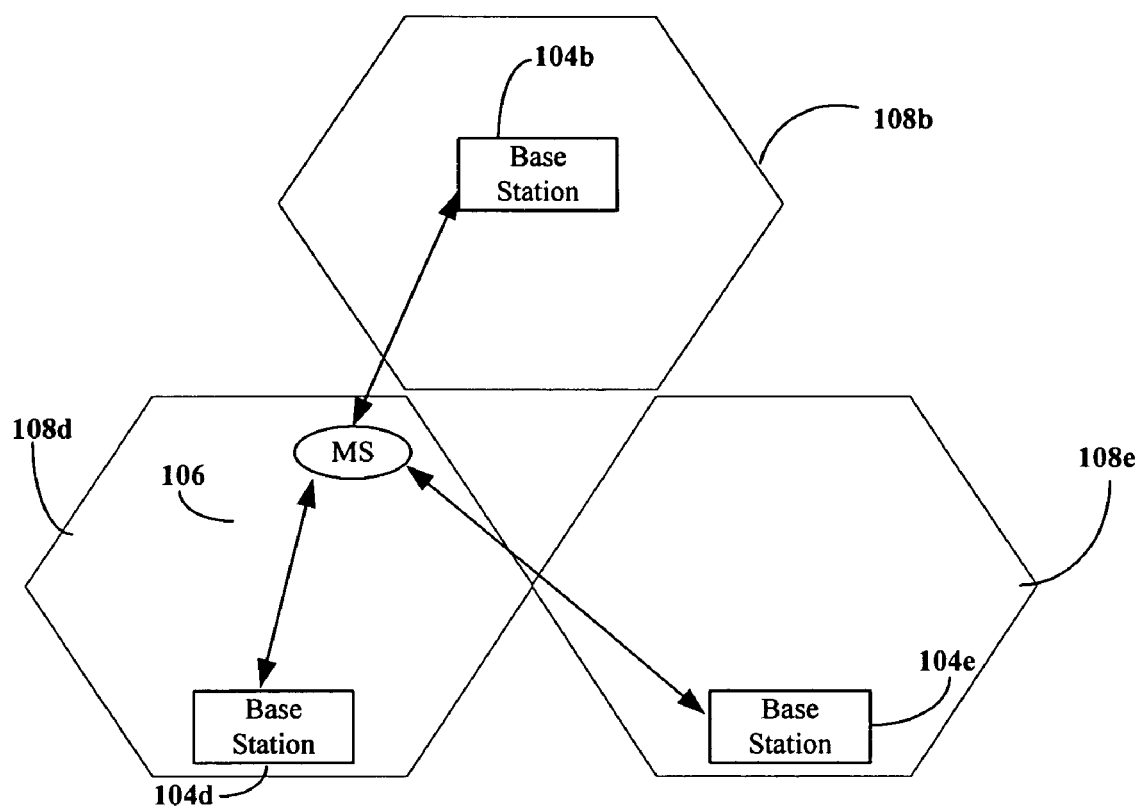
FIG. 2 is an illustration of a portion of a wireless communication system.

One example of such a mobile station 106 is a cellular telephone used by a vehicle driver who converses on the cellular telephone while driving in a cell 108b. Referring to FIG. 2, a portion of a wireless system is shown. The cellular telephone synchronizes communication with the base station 104b by monitoring a pilot that is generated by the base station 104b. While powered on, the mobile station 106 continues to scan predetermined CDMA system frequencies for pilots from other base stations 104 such as the pilots from the base stations 104d and 104e as well as the pilot corresponding to the base station 104b. Upon detecting a pilot from another base station 104d, the mobile station 106 initiates a handoff sequence to add the pilot to the Active Set. Likewise, upon determining that the energy level of an Active Set pilot has weakened sufficiently and the handoff timeout value, T_TDROP, has been exceeded, the mobile station 106 initiates a handoff sequence to drop the pilot.

Wireless communications standards, require a mobile station to use a static T_TDROP value that is generally provided by the network. The pilot add and drop thresholds, T_ADD and T_DROP respectively are similarly generally provided by the network as are additional Pilot Set Maintenance parameters. The static value of T_TDROP is used for all pilots. Using a static T_TDROP value may lead to a pilot being thrashed into and out of the active set.

Figure 3:
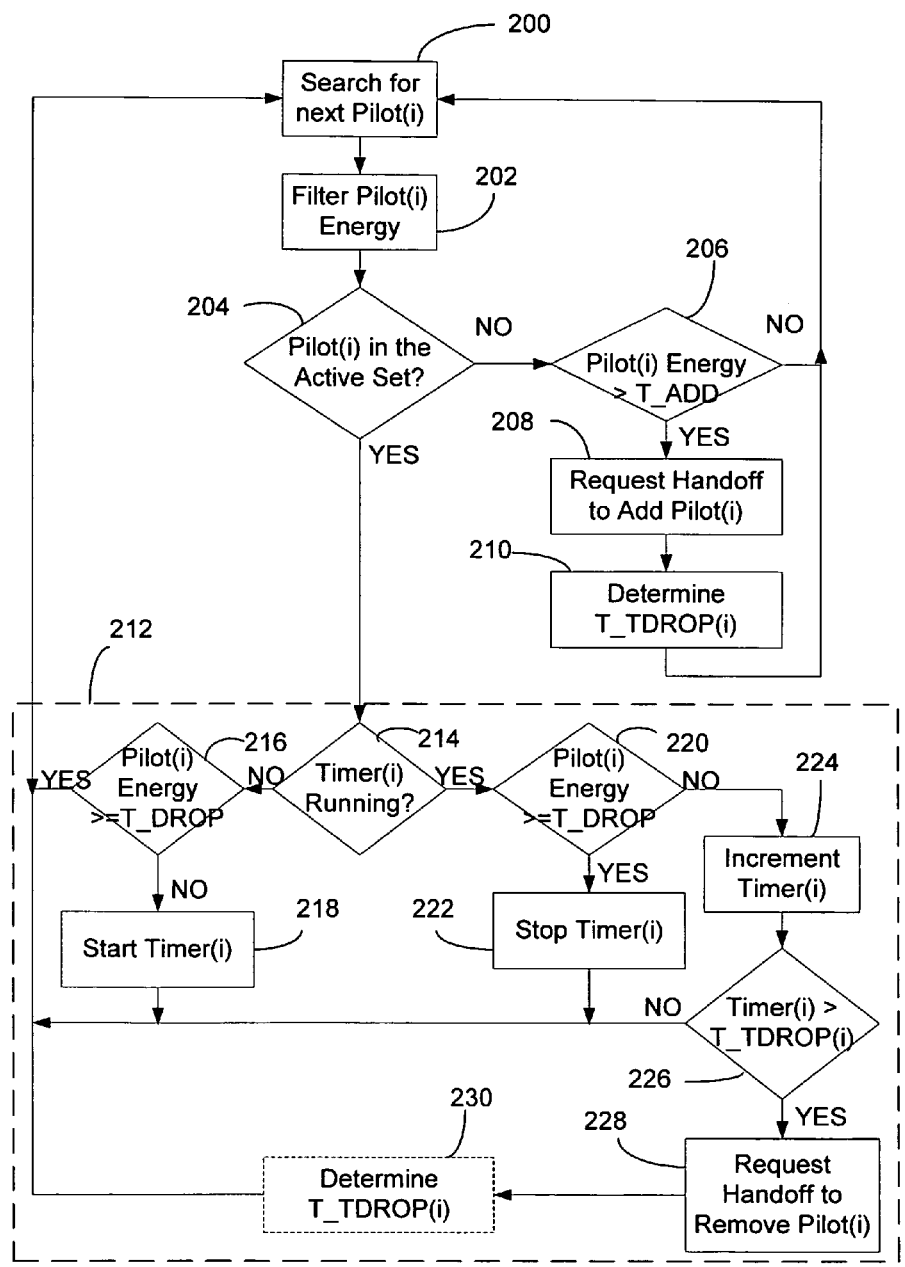
FIG. 3 is an illustration of a CDMA Handoff technique in accordance with the principles of the invention.

FIG. 3 shows a flow diagram of a Pilot Set Maintenance and handoff process in accordance with the teachings of the invention. Incorporated within the handoff process is a method of dynamically selecting a value for the handoff timeout, T_TDROP, on a per pilot basis. In one embodiment this value may be selected within a range of permissible values where the network generally transmits such parametric information through base stations 104 transmitting to mobile stations 106. These parameters can be included in overhead messages, parameter messages, traffic or idle messages, or handoff messages. The network may specify such a range by either specifying a nominal handoff timeout value and a range about that nominal value or by specifying maximum and minimum values. The range may be specified indirectly according to a formula or table lookup. In one embodiment, the range may be specified by the network as an index into the static T_TDROP table included in the IS-95-A standard. In another embodiment, the range may be specified by a Handoff Timeout Deviation about a nominal value such that the adapted handoff timeout is limited to being between [Nominal Handoff Timeout× $(1-2^{8-Handoff\ Timeout\ Deviation})$] and [Nominal Handoff Timeout× $(1+2^{8-Handoff\ Timeout\ Deviation})$]. In this case, the network need only send the Nominal Handoff Timeout and the Handoff Timeout Deviation parameters.

The network can be calibrated or configured with parameter values as a result of network engineering or that are known to result in compliance with minimum performance standards.

Dynamically selecting the T_TDROP value advantageously improves the signal to noise ratio (SNR) of the system, increases capacity, reduces the signaling overhead, and reduces the chances of a call being inadvertently dropped. The described handoff process is merely exemplary and is non-limiting. The scope of the invention is not limited to the described handoff process. In addition, although the process is described as being executed within a mobile station, the scope of the invention includes performing the process either entirely or partially in other system components such as base stations and mobile switching centers.

At block 200, the mobile station 106 searches for pilots from base stations 104 and measures their energies. When a pilot's energy is measured, the process proceeds to block 202 and the pilot energy is filtered such as using an infinite impulse response filter, or a running average or mean. Proceeding to block 204 the Active Set is checked to determine if the pilot is active, i.e. included. If the pilot is not active, then at block 206 the energy level of the pilot is tested against the default minimum required energy level for adding a pilot, T_ADD. If the energy level of the pilot does not exceed T_ADD, control returns to the start of the process at block 200. If the energy level of the pilot does exceed T_ADD, the mobile station 106 moves the pilot into the Candidate Set and sends a Pilot Strength Measurement Message (PSMM) to the current base stations to request that the pilot be added to the Active Set, block 208. Proceeding to block 210, the mobile station 106 then determines an adapted value for the pilot drop handoff timeout, T_TDROP. At a later step in the handoff process, the value of T_TDROP is compared to the time duration that the pilot signal energy is below a predetermined level to determine whether a request to drop the pilot should be sent. The adapted value of T_TDROP is determined on a per pilot basis.

In the present embodiment of the handoff process, the value of T_TDROP is adapted for each specific pilot at the time of a handoff request to add that pilot. The scope of the invention also includes adapting the value of T_TDROP periodically, as well as at other times within the handoff process such as a request to remove a pilot, block 230. In other embodiments, the adaptation could occur when a pilot energy crosses a threshold, parametric information is updated from the network, or at the time of measuring pilot energy. In addition, a single value of T_TDROP may be dynamically determined and applied to all pilots or particular sets of pilots. For example, these sets could be the Active Set, Neighbor Set, Candidate Set, and Remaining Set.

Returning to block 204, if the pilot that was detected is an active pilot, control continues on to block 212 to timer operations and determining whether to remove the pilot. Block 214 checks if the timer corresponding to the pilot is running or stopped. If the timer is not running, then the process continues to block 216. If Ec/Io is equal to or exceeds T_DROP, the pilot strength is considered sufficient to retain the pilot in the Active Set and control returns to the start of the process. Otherwise, if Ec/Io is less than T_DROP for the Active Set pilot, then instead of immediately removing the pilot from the Active Set, the timer begins a timeout sequence, block 218. If a later measurement of Ec/Io for the pilot exceeds T_DROP before the timer times out by reaching T_TDROP, the timer is reset, blocks 220 and 222.

On the other hand, if a later measurement of Ec/Io does not exceed T_DROP, then continuing to block 224, the timer is incremented. At block 226, the timer is compared to the adapted value of T_TDROP(i) corresponding to the pilot to determine whether the timer has timed out. If the timer has not timed out, control returns to the start of the process at block 200. If the timer has timed out, indicating that the pilot strength has been below T_DROP for an interval exceeding T_TDROP, the process proceeds to block 228 and the mobile station 106 sends a Pilot Strength Measurement Message (PSMM) to the current Base Stations 104 requesting a Handoff Direction Message (HDM) to remove the pilot from the Active Set.

Figure 4:
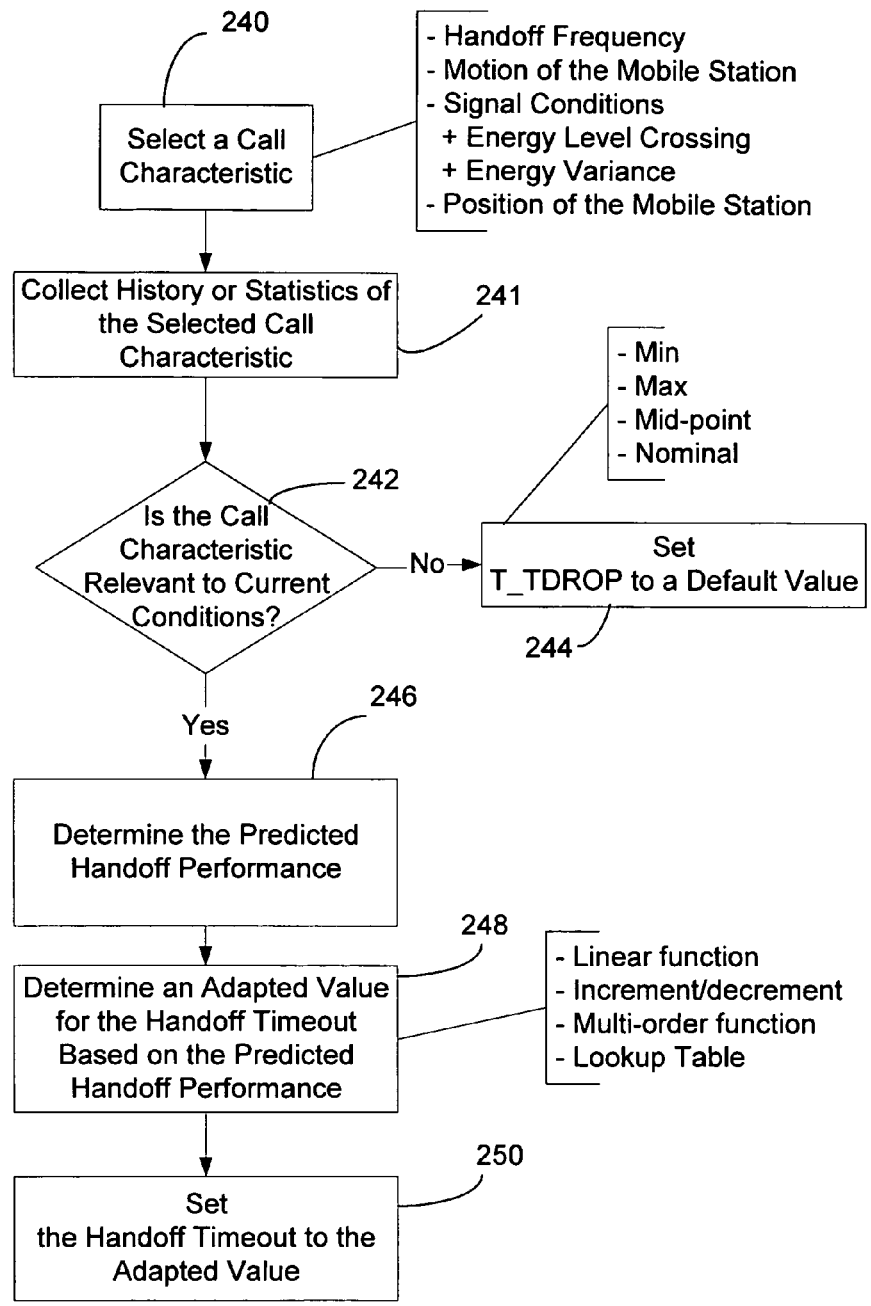
FIG. 4 is an illustration of a timeout adaptation method in accordance with the principles of the invention.

Referring to FIG. 4, a block diagram of an adaptation process for dynamically determining the handoff timeout value, T_TDROP, is shown. Initially, at block 240 a call characteristic that can be statistically analyzed for predicted performance is selected. In one embodiment, the handoff frequency is selected. However, the scope of the invention includes other call characteristics such as motion of the mobile station, signal quality (as indicated by but not limited to combined Eb/Nt, Frame Error Rate, Symbol Error Rate, Bit Error Rate, number of retransmissions), energy level crossing, and energy variance. A history or statistics are collected for the selected call characteristic, block 241. History may include the recent timing of handoffs adding or deleting pilots, the recent signal quality changes over time, position and motion of the wireless mobile station, or the past adapted handoff timeout values that were in use. Data relevant to the call characteristic is evaluated to determine if that characteristic is relevant to the current conditions, block 242. The call characteristic data includes historical or statistical information of the call characteristic. For example, if handoff frequency is the selected call characteristic, then the history of additions and drops of the pilot is evaluated to determine if the time since the last drop is greater than a predetermined minimum time; if so, then handoff frequency is considered not currently relevant. If the call characteristic is considered not currently relevant, the process continues on to block 244 and the value of T_TDROP is set to a default timeout value. The default timeout value is preferably a minimum time, however the default timeout value may be other measures of time such as a maximum or a mid-point. If the call characteristic is relevant, the process proceeds to block 246 and the predicted handoff performance is determined. Then at block 248 of the process, a new adapted value for the handoff timeout is determined based upon the predicted handoff performance and the current handoff timeout value. A linear function is applied to the current handoff timeout value to determine the adapted handoff timeout value. The scope of the invention also includes employing other functions for determining the adapted handoff value such as applying a multi-order function, incrementing/decrementing by a fixed quantity, and selecting a value from a lookup table that is constructed based on past decisions. T_TDROP is then set to the adapted value at block 250 of the process.

Figure 5:
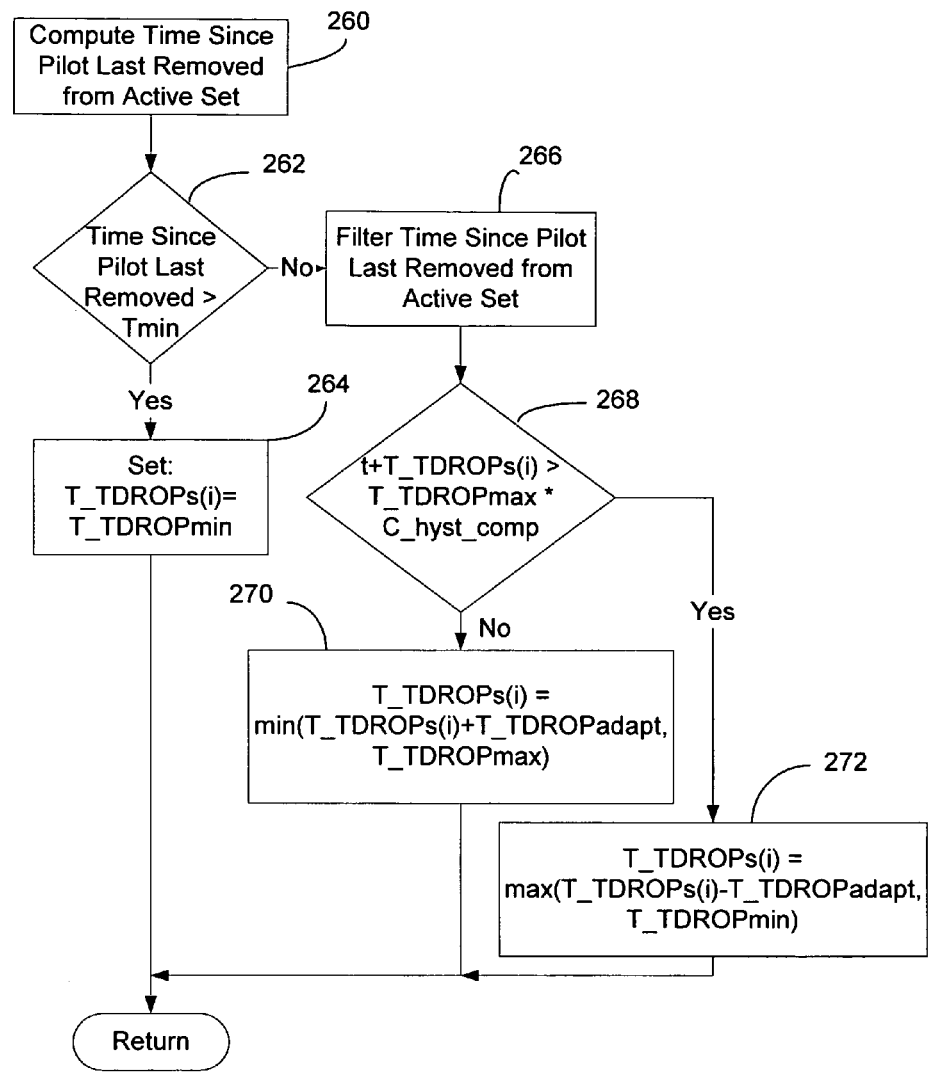
FIG. 5 is an illustration of an embodiment of a timeout adaptation method in accordance with the principles of the invention.

Referring to FIG. 5, a detailed flow diagram of an embodiment of the handoff adaptation is illustrated. The flow diagram illustrates a method of determining predicted handoff performance in order to effectively adapt the value of handoff timeout. The handoff adaptation uses the past performance of the handoff frequency to compute an adapted value. The time since the pilot was last removed from the Active Set is computed so that the relevance of using the handoff frequency can be evaluated, block 260. Proceeding to process block 262, if the time since the last drop is greater than Tmin, the process continues on to block 264 where the value of T_TDROPs(i) is set equal to the default value T_TDROPmin. If the time since the last drop is less than Tmin, then the process proceeds to block 266 and statistics on the periods of time that the pilot has remained out of the active set are collected. The historical data is used to determine whether the total estimated time that the pilot could be removed from the Active Set is less than the maximum drop timer value, block 268. This determines whether the T_TDROP value can be adapted so that the pilot is not thrashed in and out of the Active Set needlessly. If the pilot is likely to be thrashed, then the process proceeds to block 270 and the value of T_TDROP is incremented. Otherwise the process continues on to block 272, and the value of T_TDROP is decremented. The rate or amount of increment and decrement may be based on adaptive functions, fixed functions, functions that are dependent on the range, as well as other well known functions. The rate or amount of increment and decrement may be transmitted by the network. In one embodiment, the rate or amount of increment and decrement may be computed by scaling a nominal step value by a function of the current set of minimum time periods associated with a set of pilots. In another embodiment, the function for the amount of increment is a scaling by the ratio of the number of handoff timeouts above the nominal timeout to the total handoff timeouts and the function for the amount of decrease is a scaling by the ratio of the number of handoff timeouts below the nominal timeout to the total handoff timeouts.

A hysteresis factor, C_hyst_comp, block 268, may be used to compensate for differences between the add and drop energy thresholds. In one embodiment, the hysteresis factor is larger if the difference between the pilot add and drop thresholds T_ADD and T_DROP respectively is large and vice-versa. In the embodiment shown in FIG. 5, the hysteresis factor is multiplied by the maximum value of the range of the dynamic handoff timeout value and compared to the sum of the time since the last handoff and the current handoff timeout value. If the hysteresis factor term is less than the sum, this indicates that even using the maximum handoff timeout value may be unlikely to result in a pilot being kept during a drop in energy below the T_DROP threshold and, therefore, T_TDROP is decremented according to block 270. If the hysteresis factor term is greater than the sum, this indicates that using a larger handoff timeout value may enable the mobile station to avoid dropping a pilot whose energy temporarily drops below the T_DROP threshold and, therefore, T_TDROP is incremented according to block 272.

Referring to FIG. 6, waveforms associated with a mobile station 106 dropping and adding a pilot in accordance with the teachings of the invention are shown. A first waveform 280 shows a channel 1 test pilot in which the pilot energy-to-interference ratio, Ec/Io, remains greater than the threshold value at which a pilot is moved into the candidate set, T_ADD. A second waveform 282 shows a channel 2 test pilot in which Ec/Io fluctuates from above T_ADD to below T_DROP. An active set maintenance profile 284 shows the channel 2 pilot set maintenance of the mobile station 106 in response to the fluctuations of the channel 2 test pilot. The profile 284, being high or low, signifies that the channel 2 pilot is in or out, respectively, of the active set.

For the initial couple of cycles of the active set waveform, the channel 2 test pilot is added and dropped in conjunction with changes in Ec/Io. Then, at point A 286 of the active set maintenance profile 284, the adaptation of T_TDROP to a larger value, causes the mobile station 106 to retain the channel 2 test pilot in the active set despite Ec/Io of channel 2 being less than T_DROP. The channel 2 test pilot is retained in the active set until at point B 288 the adapted value of T_TDROP is exceeded and the channel 2 test pilot is dropped from the active set.

A test procedure for testing the operation of the adaptation technique may include Active Set Loss Detection tests included in TIA/EIA/IS-98-C, Recommended Minimum Performance Standards for Dual-Mode Spread Spectrum Mobile Stations, which is hereby incorporated by reference in its entirety. In another embodiment the test procedure may include testing for compliance with the expected behavior similar to that shown in FIG. 6. That test procedure includes varying the amplitudes and time durations associated with the call characteristics to verify the operating characteristics of the adaptation technique. For example, either the amplitude of the pilot energy or the time duration that the pilot energy is below T-DROP may be varied to test the adaptation algorithm. Increasing the amplitude of the pilot energy during a drop, or decreasing the time duration of a drop, both cause an increase in the adaptation of T-TDROP, leading to an increased likelihood of the pilot being retained in the Active Set.

A number of embodiments of the invention have been described. Nevertheless, it will be understood that various modifications may be made without departing from the spirit and scope of the invention such as executing all or portions of the adaptation method in a base station. Accordingly, other embodiments are within the scope of the following claims.

What is claimed is:

1. A method of determining handoff timing parameters in a wireless device, comprising:
 a) measuring a call characteristic;
 b) determining if the call characteristic is relevant to current conditions at a mobile station;
 c) in response to determining that the call characteristic is relevant, determining, at the mobile station, an adapted value for handoff timeout based on the call characteristic;
 d) setting the handoff timeout to the adapted value; and
 e) deciding to send a handoff request if the handoff timeout expires; wherein
 determining the adapted value includes;
 determining a predicted handoff performance;
 determining the adapted value for the handoff timeout based on the predicted handoff performance; and
 determining the adapted value includes applying an adaptation function to a current value of the handoff timeout.

2. The method of claim 1 wherein the adaptation function limits the adapted value between a maximum value and a minimum value.

3. The method of claim 1 wherein the adaptation function is selected from the group consisting of a linear function, a multi-order function, incrementing or decrementing by a fixed quantity, and selecting a value from a lookup table.

4. A method of determining handoff timing parameters in a wireless device, comprising:
 a) measuring a call characteristic;
 b) determining if the call characteristic is relevant to current conditions at a mobile station;
 c) in response to determining that the call characteristic is relevant, determining, at the mobile station, an adapted value for handoff timeout based on the call characteristic;
 d) setting the handoff timeout to the adapted value; and
 e) deciding to send a handoff request if the handoff timeout expires; wherein
 determining the adapted value includes;
 determining a predicted handoff performance;
 determining the adapted value for the handoff timeout based on the predicted handoff performance; and
 the step of determining the adapted value includes setting the handoff timeout value to a nominal value within a range of values.

5. A method of determining handoff timing parameters in a wireless device, comprising:
 a) measuring a call characteristic;
 b) determining if the call characteristic is relevant to current conditions at a mobile station;
 c) in response to determining that the call characteristic is relevant, determining, at the mobile station, an adapted value for handoff timeout based on the call characteristic;
 d) setting the handoff timeout to the adapted value;
 e) deciding to send a handoff request if the handoff timeout expires; and
 setting the handoff timeout value to a default value if the call characteristic is not relevant to current conditions.

6. The method of claim 5 wherein the default value is selected from the group consisting of a minimum value, a maximum value, a mid-point value between the minimum value and maximum value, and a specified nominal value.

7. A method of determining handoff timing parameters in a wireless device, comprising:
 a) measuring a call characteristic;
 b) determining if the call characteristic is relevant to current conditions at a mobile station;
 c) in response to determining that the call characteristic is relevant, determining, at the mobile station, an adapted value for handoff timeout based on the call characteristic;
 d) setting the handoff timeout to the adapted value;
 e) deciding to send a handoff request if the handoff timeout expires; and
 receiving a range of adapted values of handoff timeout; and limiting the adapted value of the handoff timeout to within the range of adapted values.

8. A method of determining handoff timing parameters for a wireless device, comprising:
 a) measuring a call characteristic;
 b) determining if the call characteristic is relevant to current conditions at a mobile station;
 c) if the call characteristic is relevant;
  i) determining a predicted handoff performance; and
  ii) determining, at the mobile station, an adapted value for handoff timeout based on the predicted handoff performance;
  iii) setting the handoff timeout, at the mobile station, to the adapted value;
 d) if the call characteristic is not relevant, setting the handoff timeout to a default value, and
 e) deciding to send a handoff request if the handoff timeout expires.

9. The method of claim 8 wherein the call characteristic is selected from the group consisting of handoff frequency, energy level crossing, motion of the wireless device, energy variance, and signal quality.

10. The method of claim 8 wherein determining the predicted handoff performance includes;
 collecting statistics of the call characteristic; and
 computing the predicted handoff performance based on the call characteristic statistics.

11. The method of claim 8 wherein determining the adapted value includes applying an adaptation function to the current value of the handoff timeout.

12. The method of claim 11 wherein the adaptation function limits the adapted value between a maximum value and a minimum value.

13. The method of claim 11 wherein the adaptation function is selected from the group consisting of a linear function, a multi-order function, incrementing or decrementing by a fixed quantity, and selecting a value from a lookup table.

14. The method of claim 8 wherein the default value is selected from the group consisting of a minimum value, a maximum value, a mid-point value between the minimum value and maximum value, and a specified nominal value.

15. A system for performing handoffs in a wireless communication network, comprising:
   a) a mobile station executing a dynamic handoff timeout algorithm for adapting a handoff timeout value; and
   b) a plurality of base stations wherein at least one of said plurality of base stations communicates with the mobile station using a parameter configuration protocol for communicating parameters for use by the dynamic handoff algorithm from at least one of the plurality of base stations to the mobile station; wherein
   the mobile station measures a call characteristic;
   the adapting a handoff timeout value is based on the call characteristic; and
   at least one of said base stations generates a pilot having an energy level; and wherein said dynamic handoff timeout algorithm decrements said handoff timeout value for the pilot if said mobile station predicts, based on said call characteristic that said pilot energy level will be below a threshold for a time greater than a maximum allowed handoff timeout value.

16. The system of claim 15 wherein said maximum allowed handoff timeout value is multiplied by a hysteresis factor before said mobile station predicts.

17. A system for performing handoffs in a wireless communication network, comprising:
   a) a mobile station executing a dynamic handoff timeout algorithm for adapting a handoff timeout value; and
   b) a plurality of base stations wherein at least one of said plurality of base stations communicates with the mobile station using a parameter configuration protocol for communicating parameters for use by the dynamic handoff algorithm from at least one of the plurality of base stations to the mobile station; wherein
   the mobile station measures a call characteristic;
   the adapting a handoff timeout value is based on the call characteristic;
   at least one of said base stations generates a pilot having an energy level; and
   said dynamic handoff timeout algorithm increments said handoff timeout value for the pilot if said mobile station predicts, based on said call characteristic, said pilot energy level will be below a threshold for a time less than a maximum allowed handoff timeout value.

18. The system of claim 17 wherein said maximum allowed handoff timeout value is multiplied by a hysteresis factor before said mobile station predicts.

19. A system for performing handoffs in a wireless communication network, comprising:
   a) a mobile station executing a dynamic handoff timeout algorithm for adapting a handoff timeout value; and
   b) a plurality of base stations wherein at least one of said plurality of base stations communicates with the mobile station using a parameter configuration protocol for communicating parameters for use by the dynamic handoff algorithm from at least one of the plurality of base stations to the mobile station; wherein
   the mobile station measures a call characteristic;
   the adapting a handoff timeout value is based on the call characteristic;
   the mobile station executes pilot set maintenance and maintains pilot drop timers, and wherein the call characteristic is a pilot energy; and
   the mobile station further determines a relevant history that limits said adaptation algorithm to use a default value when said call characteristic is not currently relevant.

20. The system of claim 19 wherein relevance of said call characteristic is a function of the time since the last handoff of a plurality of pilots.

21. The system of claim 19 wherein said default value is selected from the group consisting of a minimum value, a maximum value, a mid-point value between the minimum value and maximum value, and a specified nominal value.

22. A system for performing handoffs in a wireless communication network, comprising:
   a) a mobile station executing a dynamic handoff timeout algorithm for adapting a handoff timeout value; and
   b) a plurality of base stations wherein at least one of said plurality of base stations communicates with the mobile station using a parameter configuration protocol for communicating parameters for use by the dynamic handoff algorithm from at least one of the plurality of base stations to the mobile station; wherein
   said dynamic handoff timeout algorithm is implemented in said mobile station.

23. A system for performing handoffs in a wireless communication network, comprising:
   a) a mobile station executing a dynamic handoff timeout algorithm for adapting a handoff timeout value; and
   b) a plurality of base stations wherein at least one of said plurality of base stations communicates with the mobile station using a parameter configuration protocol for communicating parameters for use by the dynamic handoff algorithm from at least one of the plurality of base stations to the mobile station; wherein
   said parameters communicated by said parameter configuration protocol include a Nominal Handoff Timeout value and a Handoff Timeout Deviation value which are used to specify the end-points of a range of allowed values for said adapted handoff timeout as follows:

$$[\text{Nominal Handoff Timeout} \times (1 - 2^{8-\text{Handoff Timeout Deviation}})] \text{ and}$$
$$[\text{Nominal Handoff Timeout} \times (1 - 2^{8-\text{Handoff Timeout Deviation}})].$$

24. A system for performing handoffs in a wireless communication network, comprising:
   a) a mobile station executing a dynamic handoff timeout algorithm for adapting a handoff timeout value; and
   b) a plurality of base stations wherein at least one of said plurality of base stations communicates with the mobile station using a parameter configuration protocol for communicating parameters for use by the dynamic handoff algorithm from at least one of the plurality of base stations to the mobile station; wherein
   said parameters communicated by said parameter configuration protocol include parameters selected from the group consisting of a nominal handoff timeout value, a range of handoff timeout values about a nominal handoff timeout value, a maximum handoff timeout value, a minimum handoff timeout value, an index into a table of parameter configurations stored in said mobile station, a plurality of inputs to a plurality of formulae that indirectly determine the values of parameters, a minimum time since the mobile station last dropped, a hysteresis compensation factor, an adaptation value to increment the handoff timeout value, and an adaptation value to decrement the handoff timeout value.

25. A system for performing handoffs in a wireless communication network, comprising:
   a) a mobile station executing a dynamic handoff timeout algorithm for adapting a handoff timeout value; and
   b) a plurality of base stations wherein at least one of said plurality of base stations communicates with the mobile station using a parameter configuration protocol for communicating parameters for use by the dynamic handoff algorithm from at least one of the plurality of base stations to the mobile station; wherein
   said mobile station stores said parameters for later use by said adaption algorithm.

26. A method for testing a dynamic handoff timeout algorithm used within a wireless communication system, comprising:
   a) communicating a plurality of test inputs representing channel signals to a mobile station, each of the plurality of test inputs having an energy level;
   b) communicating dynamic handoff timeout algorithm parameters to said mobile station;
   c) operating said mobile station in call mode using said test inputs;
   d) periodically varying the energy level of at least one of the plurality of test inputs above a pilot add threshold and below a pilot drop threshold;
   e) performing said dynamic handoff timeout algorithm;
   f) monitoring handoffs and handoff timing associated with the mobile station; and
   g) comparing said handoffs and handoff timing to a minimum performance reference.

27. The method of claim 26 further comprising varying the time said energy level of at least one of said plurality of test inputs is above said add threshold and below said drop threshold.

28. A method for executing a handoff operation in a mobile station, comprising:
   scanning a pilot signal of predetermined system frequencies;
   measuring an energy level of the pilot signal;
   selecting at the mobile station a handoff timeout value within a range of permissible values;
   assigning the handoff timeout value at the mobile station;
   determining if the energy level of the pilot signal drops below a threshold level for a time period exceeding the handoff timeout value;
   executing a handoff operation based on the determination; and
   storing the range of permissible values for the handoff timeout values at the mobile station.

29. The method of claim 28, wherein the range of permissible values is received at the mobile station from a base station.

30. The method of claim 28, further comprising, receiving from a base station at the mobile station at least one parameter, and determining the range of permissible value based on the parameter.

31. The method of claim 30, wherein the parameter is used to determine a minimum handoff timer value of the range of permissible value and a maximum handoff timeout value of the range of permissible value.

32. The method of claim 28, further comprising, setting at the mobile station a minimum handoff timer value of the range of permissible value and a maximum handoff timeout value of the range of permissible value.

33. A method for executing a handoff operation in a mobile station, comprising:
   scanning a pilot signal of predetermined system frequencies;
   measuring an energy level of the pilot signal;
   determining by the mobile station a handoff timeout value within a range of permissible values;
   determining if the energy level of the pilot signal drops below a threshold level for a time period exceeding the handoff timeout value;
   executing a handoff operation based on the determination; and
   storing the range of permissible values for the handoff timeout values at the mobile station.

34. The method of claim 33, further comprising, receiving from a base station at the mobile station at least one parameter, and determining the range of permissible value based on the parameter.

35. The method of claim 34, wherein the parameter is used to determine a minimum handoff timer value of the range of permissible value and a maximum handoff timeout value of the range of permissible value.

36. The method of claim 33, further comprising, setting at the mobile station a minimum handoff timer value of the range of permissible value and a maximum handoff timeout value of the range of permissible value.

37. A method for executing a handoff operation in a mobile station, comprising:
   scanning pilot signals of predetermined system frequencies;
   measuring the energy level of each pilot signal;
   selecting at the mobile station a handoff timeout value for each pilot signal within a range of permissible values;
   assigning the handoff timeout value for each pilot signal at the mobile station;
   determining if the energy level of each pilot signal drops below a threshold level for a time period exceeding the handoff timeout value assigned for that pilot signal;
   executing a handoff operation based on the determination; and
   storing the range of permissible values for the handoff timeout values at the mobile station.

38. The method of claim 37, wherein each handoff timeout value is assigned at the mobile station to a respective pilot in the mobile station's active set.

39. A method for executing a handoff operation in a mobile station, comprising:
   scanning a pilot signal of predetermined system frequencies;
   measuring an energy level of the pilot signal;
   determining if the energy level of the pilot signal drops below a threshold level for a time period exceeding a handoff timeout value; and
   executing a handoff operation based on the determination;
   wherein the handoff timeout value is varied at the mobile station dynamically and autonomously.

40. The method of claim 39, wherein the handoff timeout value is set within a range of permissible values determined at the mobile station.

* * * * *